United States Patent
Herzog et al.

(10) Patent No.: US 10,137,633 B2
(45) Date of Patent: Nov. 27, 2018

(54) METHOD AND DEVICE FOR CONTROLLING THE EXPOSURE OF A SELECTIVE LASER SINTERING OR LASER MELTING DEVICE

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Markus Lippert, Lichtenfels (DE); Johanna Windfelder, Breitbrunn (DE)

(73) Assignee: CL SCHUTZRECHTSVERWALTUNGS GMBH, Lichtenfels (DE)

( * ) Notice: Subject to any disclaimer, the term of this patent is extended or adjusted under 35 U.S.C. 154(b) by 0 days.

(21) Appl. No.: 15/526,711

(22) PCT Filed: Nov. 5, 2015

(86) PCT No.: PCT/EP2015/075832
§ 371 (c)(1),
(2) Date: May 12, 2017

(87) PCT Pub. No.: WO2016/075026
PCT Pub. Date: May 19, 2016

(65) Prior Publication Data
US 2017/0320264 A1    Nov. 9, 2017

(30) Foreign Application Priority Data

Nov. 12, 2014   (DE) .................. 10 2014 016 679

(51) Int. Cl.
*B29C 64/153*   (2017.01)
*B33Y 50/02*   (2015.01)
(Continued)

(52) U.S. Cl.
CPC .......... *B29C 64/153* (2017.08); *B22F 3/1055* (2013.01); *B23K 26/0604* (2013.01);
(Continued)

(58) Field of Classification Search
CPC ....... B33Y 50/02; B33Y 10/00; B29C 64/153; B23K 26/0604
See application file for complete search history.

(56) References Cited

U.S. PATENT DOCUMENTS

2003/0052105 A1    3/2003   Nagano et al.
2013/0270750 A1*  10/2013   Green ................ B29C 67/0077
                                                        264/497

(Continued)

FOREIGN PATENT DOCUMENTS

DE    102013208651 A1   11/2014
EP       2186625 A2     5/2010
JP      2009-006509 A * 1/2009

OTHER PUBLICATIONS

Machine translation of Japan Patent document 2009-006,509-A, Dec. 2017.*

*Primary Examiner* — Geoffrey S Evans
(74) *Attorney, Agent, or Firm* — Troutman Sanders LLP

(57) ABSTRACT

A method for controlling the exposure of a selective laser sintering or laser melting apparatus. The method includes providing a selective laser sintering apparatus or laser melting apparatus that uses successive solidification of layers of a powder-type construction material that can be solidified using radiation. The apparatus comprises an irradiation device for irradiating layers of the construction material that has a plurality of scanners that can separately be actuated, simultaneously irradiating the construction material, the separate detection of irradiation times of each scanner and/or the irradiation areas detected by each scanner, and storing the detected irradiation times and/or irradiation areas; com- (Continued)

paring the irradiation times and/or irradiation areas of the scanners with each other; re-determining the surface sections of a powder layer to be irradiated by each scanner so the irradiation times for each scanner are approximated to each other and/or the irradiation areas of each scanner are aligned.

8 Claims, 2 Drawing Sheets

(51) Int. Cl.
| | |
|---|---|
| *B22F 3/105* | (2006.01) |
| *B33Y 10/00* | (2015.01) |
| *B33Y 30/00* | (2015.01) |
| *B29C 64/393* | (2017.01) |
| *B23K 26/06* | (2014.01) |
| *G02B 26/10* | (2006.01) |
| *H01S 3/101* | (2006.01) |
| *H01S 3/102* | (2006.01) |
| *B29C 64/277* | (2017.01) |

(52) U.S. Cl.
CPC .......... *B29C 64/277* (2017.08); *B29C 64/393* (2017.08); *B33Y 10/00* (2014.12); *B33Y 30/00* (2014.12); *B33Y 50/02* (2014.12); *G02B 26/10* (2013.01); *H01S 3/101* (2013.01); *H01S 3/102* (2013.01); *B22F 2003/1056* (2013.01); *B22F 2003/1057* (2013.01); *Y02P 10/295* (2015.11)

(56) References Cited

U.S. PATENT DOCUMENTS

| | | | |
|---|---|---|---|
| 2014/0198365 A1* | 7/2014 | Li | G02B 26/123 |
| | | | 359/201.2 |
| 2014/0263209 A1 | 9/2014 | Burris et al. | |
| 2015/0283612 A1* | 10/2015 | Maeda | B22F 3/1055 |
| | | | 425/78 |

* cited by examiner

METHOD AND DEVICE FOR CONTROLLING THE EXPOSURE OF A SELECTIVE LASER SINTERING OR LASER MELTING DEVICE

CROSS-REFERENCE TO RELATED APPLICATIONS

This application is a United States national stage entry of an International Application serial no. PCT/EP2015/075832 filed Nov. 5, 2015 which claims priority to German Patent Application serial no. 10 2014 016 679.1 filed Nov. 12, 2014. The contents of these applications are incorporated herein by reference in their entirety as if set forth verbatim.

The invention relates to a method for controlling the exposure of a selective laser sintering or laser melting apparatus for manufacturing three-dimensional objects.

Furthermore, the invention relates to an apparatus for performing the method for controlling the exposure of a selective laser sintering or laser melting apparatus for manufacturing three-dimensional objects.

From DE 10 2014 005 916.2 it is known as prior art to use laser sintering or laser melting apparatuses that can be used to manufacture three-dimensional objects by selective irradiation of a construction material, with a plurality of scanners. The scanners are arranged above a construction field and can be either fixedly or movably arranged, i.e. can be moved across the construction field section by section.

In such multi-scanner systems either each portion of a construction field is assigned a separate scanner or the scanners are installed or formed such that they can at least partially expose construction field portions to which another scanner is assigned to support this other scanner in exposing the construction field portion assigned to it, if there the exposure effort in time or area is significantly higher than in the adjacent construction field portion which is to be exposed respectively less.

The present invention is based on the object of providing a method and an apparatus for performing this method, enabling an optimization of the construction process and especially a reduction of the required construction time for an object. This object is solved by the combination of the features of the claims.

In the course of the method according to the invention, the irradiation times of each individual scanner and/or the irradiation areas detected by said individual scanner are at first separately detected and stored in a first step. The detection of the irradiation times can, for example, be determined by a shutter opening signal, said shutter letting radiation energy of a radiation source pass, but other detecting possibilities are also imaginable, e.g. by light sensitive elements or the like, which provide a time signal when activating a scanner that can be electronically stored.

The detection of the irradiation areas can also be performed in different ways, either with photographic technology by detecting an irradiation image in a certain time segment or by use of irradiation times and scanner deflections already determined such that irradiated construction field portions can be determined regarding their irradiated size.

In a second step, the detected and stored irradiation time values and irradiation area values are electronically compared with each other. This can be performed by a comparator that is integrated in an appropriately suited processor or computer.

When the processor/computer determines that the irradiation times or areas deviate from each other, than for the next layer or for a next layer portion a new layout of the surface sections of a powder layer to be irradiated by each individual scanner is determined such that the irradiation times for each individual scanner are possibly approximated to each other and/or the irradiation areas of each individual scanner are aligned with each other in terms of surface area to the largest extend possible.

Said method is performed iteratively, i.e. is repeated again and again, to be able to quickly react accordingly to irradiation geometries changing during the construction process. The subdivision of scanning fields is in each case dynamically adjusted after solidification of one or more layers such that the exposure time for each scanner resulting in each subsequent irradiation course is at least approximately the same. Prior to the construction process, an operator can perform a presetting of the scanning fields for each scanner based on readable control data of the scanners. Of course, it is also possible that an operator quasi-manually intervenes in the iterative approximation of the scanning symbols and quite consciously conducts a displacement of the scanning fields, e.g. for thermal reasons or the like.

It should be suggested that the method according to the invention can also be performed as a "combined method", i.e. that e.g. irradiation times and irradiation areas are measured and e.g. from the irradiation times of a first scanner, the area irradiated by it can be concluded, which is compared with the irradiation areas of a second scanner to achieve the approximation according to the invention.

The border between the scanning fields of two scanners can be a straight line. However, if more than two scanners are used across a construction field, it can be advantageous to also select different courses of the border between the scanning fields.

If the comparison of the irradiation times and/or irradiation areas regarding each scanner results in no displacement of the scanning field borders, then it is very advantageous to have the border between the scanning fields oscillate to avoid striation on the surface.

The control according to the invention adjusts the border between the scanning fields of different scanners in an optimum manner. Though the change of melting area and position is large during an entire construction process, but mostly relatively small from layer to layer, the control is able to bring the construction time closely to the theoretical minimum by small incremental adjustment of the scanning field border throughout the entire construction process.

The invention is explained in more detail by means of advantageous exemplary embodiments in the figures of the drawings. In which.

Figure 1:
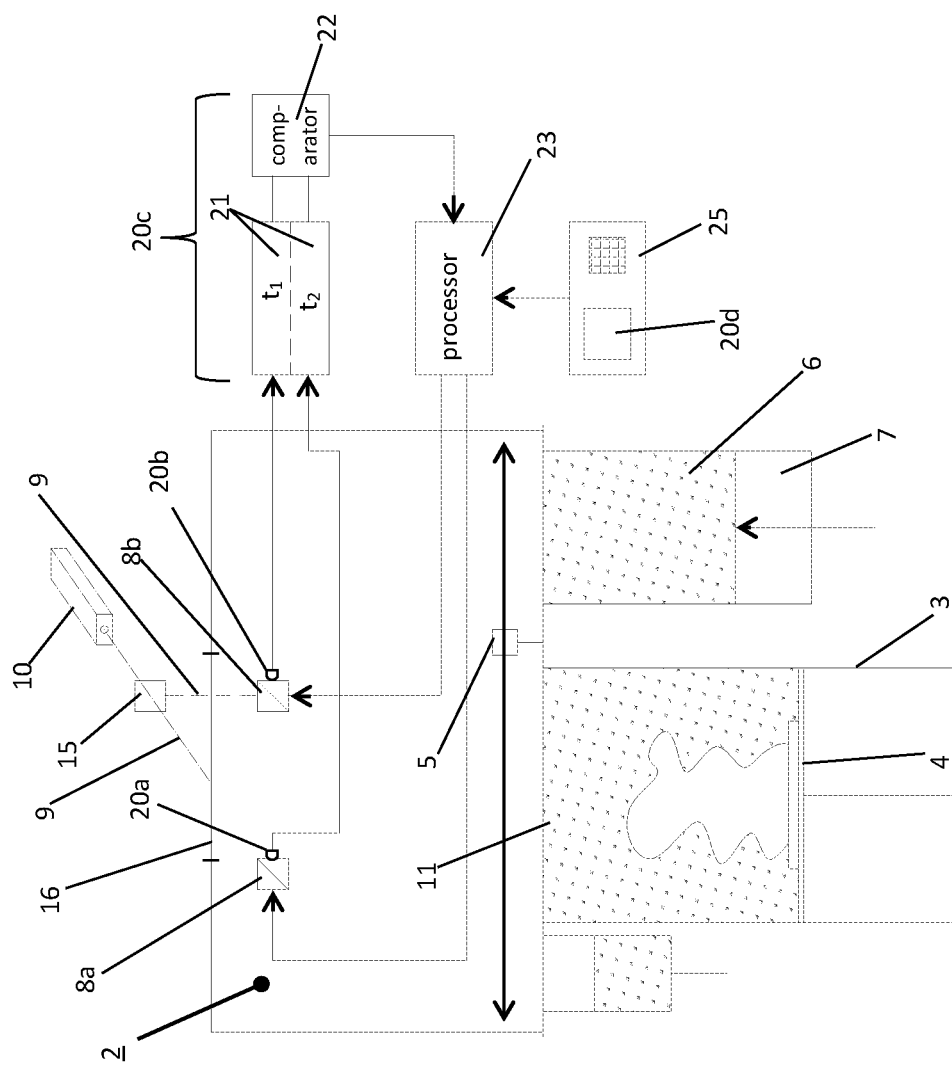
FIG. 1 shows a schematic diagram of the significant components of an apparatus for performing the method.

The apparatus 1 shown in FIG. 1 comprises as significant components a process chamber 2, in which a construction container 3 with a height adjustable construction platform 4 is arranged. Above the construction platform 4 a coating assembly 5 is arranged by which construction material 6 from a metering chamber 7 in the section of the construction container 3 can be applied in the form of thin layers. Above the construction container 3 in the process chamber 2 a plurality of scanners 8a, 8b is arranged by which the radiation 9 of a radiation source 10 can be directed to the construction material layer 11 in the form of a laser in a process-controlled manner to solidify said layer.

The components of the apparatus mentioned are only the components significant to the invention, of course, such a laser sintering or laser melting device comprises a plurality of other components that do not need to be explained in the context of this invention.

The apparatus further has electronic detection units 20*a*, 20*b*, 20*c*, 20*d* by means of which the irradiation times related to every individual scanner 8 (e.g., 8*a*, 8*b*) and/or the irradiation areas detected by a scanner 8 in an irradiation step can separately be detected and stored in an electronic storage 21.

An electronic comparator 22 is connected to the storage 21, by which the stored irradiation time values of the individual scanners 8 can be compared with each other. A processor device 23 is connected with the comparator 22, which in case of deviating irradiation time values of the individual scanners 8 calculates a re-determination of the surface sections to be exposed by each individual scanner 8 such that the irradiation times (or the irradiation areas) of each individual scanner 8 are aligned with each other in terms of surface area to the largest extent possible.

Furthermore, in FIG. 1 an input apparatus 25 having a display 26 is illustrated, by which an operator is able to intervene in the construction process of the laser sintering or laser melting apparatus 1.

It should be briefly noted that the radiation 9 of the radiation source 10 in the illustrated exemplary embodiment is directed via a beam splitter 15 and from there penetrates a window 16 in the upper section of the process chamber 2 to get to the scanners 8*a*, 8*b*.

The detection units 20*a*, 20*b*, 20*c*, 20*d* comprise sensor elements on the scanners or optical switches (shutters) connected upstream said scanners, which detect the irradiation times of the scanners 8 (e.g., 8*a*, 8*b*) and store them as irradiation time values T1 and T2 to be compared into storage 21. Said values are compared with each other in the comparator 22 to enable an optimization of the drive of the scanners by the processor.

People skilled in the art know that on the one hand the detection of irradiation times can be replaced or supplemented by a detection of irradiation areas, that the storage and the comparator can be part of an electronic system for operating the apparatus and can be integrated in a computer or a processor.

Figure 2:
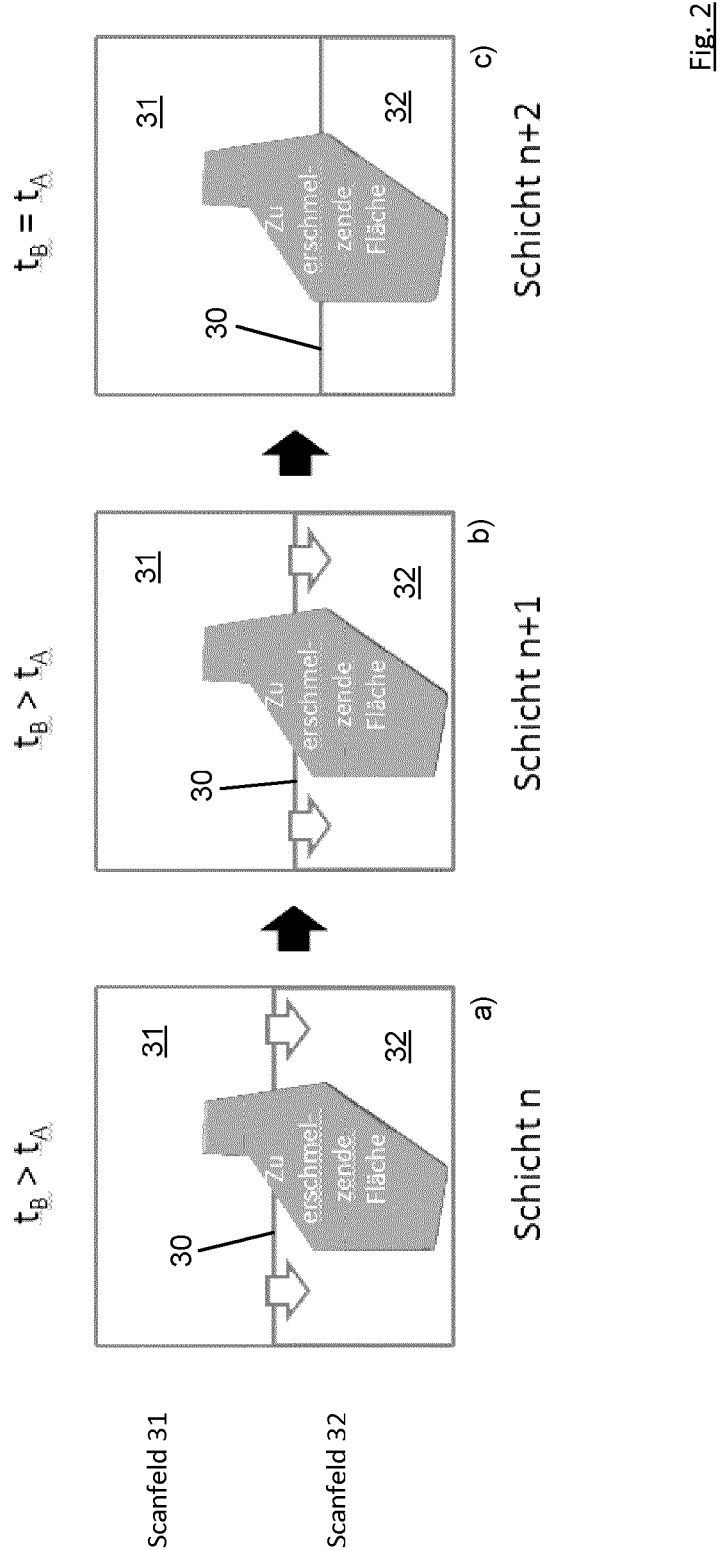
FIG. 2 shows three diagrams for scanning field adjustment, wherein in FIG. 2a a (first) layer n, in FIG. 2b another layer n+1 and in FIG. 2c a layer n+2 is shown.

In FIGS. 2*a*-2*c*, it is explained in more detail how the optimization of the scanning fields 31, 32 or the irradiation areas related to the individual scanners 8*a*, 8*b* is optimized.

In FIG. 2*a*, at first a state is shown in which the area of the scanning field 32 to be molten is larger than that of the scanning field 31. For this reason, it is purposeful to shift the border 30 between the scanning field 31 and the scanning field 32 downwards such that in the next layer n+1 according to FIG. 2*b* an approximation of the scanning fields 31, 32 has already been conducted.

This process is repeated until the scanning fields 31 and 32 are actually the same size, i.e. the irradiation times $t_A$ and $t_b$ are aligned with each other such that both scanners 8*a* and 8*b* are at least widely working at the same capacity.

If the comparative measurement of the irradiation times or scanning field sizes results in the border 30 between the scanning fields not needing to be shifted, because the irradiation times are aligned with each other, then an oscillation of the border 30 between the scanning fields 31, 32 is performed to avoid striation in the component.

LIST OF REFERENCE NUMBERS

1 Apparatus
2 Process chamber
3 Construction container
4 Construction platform
5 Coating assembly
6 Construction material
7 Metering chamber
8*a* Scanner
8*b* Scanner
9 Radiation
10 Radiation source
11 Construction material layer
15 Beam splitter
20*a* Detection unit
20*b* Detection unit
20*c* Detection unit
20*d* Detection unit
21 Storage
22 Comparator
23 Processor device
25 Input apparatus
26 Display
30 Border
31 Scanning field
32 Scanning field

The invention claimed is:

1. A method for controlling the exposure of a selective laser sintering or laser melting apparatus for manufacturing three-dimensional objects, comprising the following steps:
providing a selective laser sintering apparatus or laser melting apparatus (1) in which three-dimensional objects can be manufactured by successive solidification of layers of a powder-type construction material (6) that can be solidified using radiation, on the positions corresponding to the respective cross-section of the object, wherein the provided apparatus (1) comprises an irradiation device for irradiating layers of the powder construction material, that has a plurality of scanners (8*a*, 8*b*) that can separately be actuated, simultaneously irradiating the powder construction material,
characterized by the following steps
separately detecting irradiation times of each individual scanner (8*a*, 8*b*) and/or the irradiation areas detected by each individual scanner (8*a*, 8*b*) in a first step, and storing the detected irradiation times and/or irradiation areas;
comparing the irradiation times and/or irradiation areas of the individual scanners (8*a*, 8*b*) with each other;
re-determining the surface sections of a construction material layer (11) to be irradiated by each individual scanner such that the irradiation times for each individual scanner (8*a*, 8*b*) are approximated to each other and/or the irradiation areas of each individual scanner (8*a*, 8*b*) are aligned with each other in terms of surface area to the largest extent possible.

2. The method according to claim 1, characterized in that the subdivision of scanning fields (31, 32) is in each case dynamically adjusted after solidification of one or more construction material layers (11) such that the exposure time for each scanner (8*a*, 8*b*) resulting in the subsequent irradiation course is at least approximately the same.

3. A method according to claim 1, characterized in that prior to the construction process an operator performs a presetting of the sizes of scanning fields (31, 32) for each scanner based on readable control data of the scanners (8*a*, 8*b*).

4. A method according to claim 1, characterized in that scanning fields (31, 32) for each scanner (8a, 8b) are adapted to each other in incremental steps.

5. A method according to claim 1, characterized in that a border (30) between scanning fields (31, 32) is a straight line.

6. A method according to claim 1, characterized in that a border (30) between scanning fields (31, 32) oscillates if the comparison of irradiation times or irradiation areas regarding each of the scanners (8a, 8b) results in no displacement of a scanning field border (30).

7. A method according to claim 1, characterized in that a scanner (8a, 8b) performs voltage reduced pre-exposure of an irradiation portion in a scanning field (31, 32) of another scanner (8a, 8b).

8. A method according to claim 1, characterized in that the exposure times of pre-exposure have no impact on the scanning field border displacement.

* * * * *